(12) United States Patent
Liu

(10) Patent No.: US 6,961,428 B1
(45) Date of Patent: Nov. 1, 2005

(54) METHOD OF VIDEOTEXT INFORMATION ENCRYPTION AND SECURITY TRANSMISSION IN A NETWORK

(76) Inventor: Chao Liu, 1-701 Building of Donghuan Road Chaoyang District, Beijing 100020 (CN)

( * ) Notice: Subject to any disclaimer, the term of this patent is extended or adjusted under 35 U.S.C. 154(b) by 0 days.

(21) Appl. No.: 09/914,337

(22) PCT Filed: Feb. 18, 2000

(86) PCT No.: PCT/CN00/00029

§ 371 (c)(1),
(2), (4) Date: Aug. 23, 2001

(87) PCT Pub. No.: WO00/51283

PCT Pub. Date: Aug. 31, 2000

(30) Foreign Application Priority Data

Feb. 23, 1999 (CN) .............................. 99100872 A

(51) Int. Cl.[7] .......................... H04L 9/00; G06F 11/30; G09C 3/00; H04K 1/06
(52) U.S. Cl. .......................... 380/54; 380/37; 380/269; 713/167; 713/193; 713/201; 705/57
(58) Field of Search .............................. 380/28, 37, 54, 380/216, 217, 268, 269

(56) References Cited

U.S. PATENT DOCUMENTS

| | | | |
|---|---|---|---|
| 4,264,782 A | | 4/1981 | Konheim |
| 4,972,473 A | * | 11/1990 | Ejiri et al. .................. 380/243 |
| 5,586,185 A | | 12/1996 | Shibata et al. |
| 5,841,886 A | * | 11/1998 | Rhoads ....................... 382/115 |
| 6,205,249 B1 | * | 3/2001 | Moskowitz ................. 382/232 |
| 6,233,347 B1 | * | 5/2001 | Chen et al. ................. 382/100 |
| 6,345,104 B1 | * | 2/2002 | Rhoads ....................... 382/100 |

* cited by examiner

*Primary Examiner*—Kambiz Zand
(74) *Attorney, Agent, or Firm*—Kilpatrick Stockton LLP

(57) ABSTRACT

A technique of enciphering the graph-text document and its security transfer on a network. The sender of the graph-text document enciphers at least one graph-text document with digitizing algorithm provided by a control center and producing an enciphered and compressed cryptic document. Sender sends this enciphered cryptic document to a recipient, who prints out the enciphered graph-text document. The control center sends the positioning parameters of a reader sheet, the coordinates of the pole and the polar angle, to the recipient, who puts the reader sheet onto the document sheet at the right position and right orientation as indicated by the parameters received. The original document thus is revealed as a four dimensional (four parametric) document and is ready to be read.

2 Claims, 3 Drawing Sheets

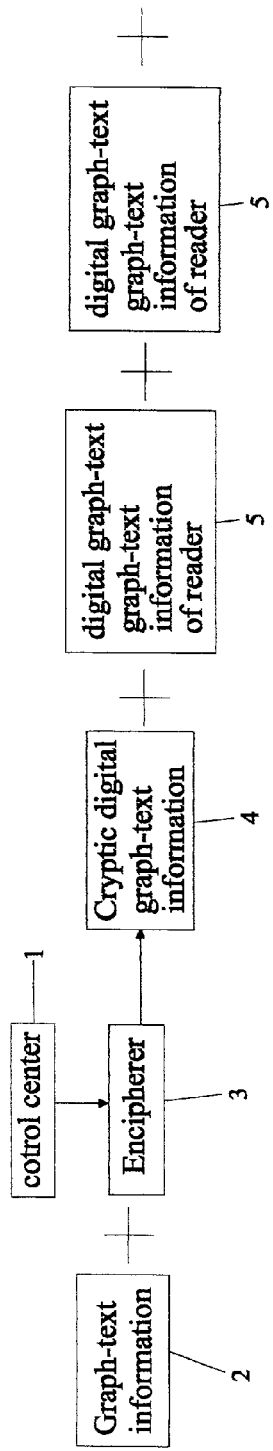
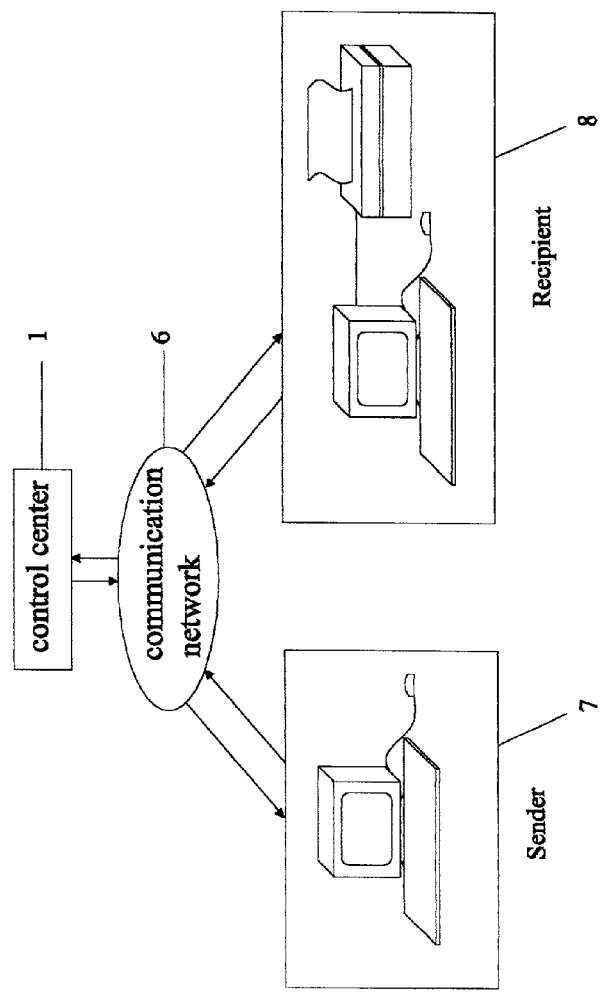

METHOD OF VIDEOTEXT INFORMATION ENCRYPTION AND SECURITY TRANSMISSION IN A NETWORK

TECHNICAL FIELD OF THE INVENTION

The present invention relates to graph-text information transfer through a wired or wireless network, and relates more particular to a technique of graph-text enciphering and its security transfer on network.

BACKGROUND OF THE INVENTION

A traditional technique of graph-text enciphering and network transfer only involves using a dedicated line and dedicated network. Coding and enciphering will only be executed during transfer. But once the information arrives at the destination, the information is no longer protected. Hence, keeping and delivering this kind of information, especially those valuable information, becomes a big problem. As the era of knowledge based economy dawns, there is a great volume of graphical or text information being transferred every day through various wired or wireless networks. Some of this information involves important technical discoveries, research results, financial secrets, trade secrets, even top national security secrets. Especially with the widespread use and application of the Internet, some hackers and criminals specialize in searching and stealing important information on the network and cause breaches of security. So it is very important to guarantee the security of information transfer and storage on a network.

SUMMARY OF THE INVENTION

The goal of the present invention is to provide a technique of graph-text enciphering and its security transfer on network. There is no need of additional hardware. Utilizing the invented digital 4D (4 dimensional) technique and existing network facilities, security of graph-text information transfer on a network can be guaranteed until arriving in the hand of a terminal recipient. If the terminal recipient separates the cryptic graph-text document from its matching reader and places them in different places, security is ensured. This technique is particularly effective when a safe is not available or documents need to be delivered by strangers.

According to the invention, the steps of enciphering the graph-text document and transferring on the network are as follows:

a. A sender of a graph-text document enciphers and compresses at least one graph-text document with a special digital code rule provided by a control center and produces a cryptic graph-text documen,t and then sends this cryptic graph-text document to a recipient and sends an acknowledgment to the control center respectively.

b. When the control center receives the acknowledgment from the sender, it sends at least one corresponding digital graph-text document for a reader to the recipient or a designated network address.

c. When the recipient receives the digital graph-text document for reader, the recipient sends the acknowledgment to the control center and prints out the cryptic digital graph-text document and at least one digital graph-text document for a reader received on the document sheets, and at least one corresponding reader, respectively, with appropriate output equipment.

d. When the control center receives the acknowledgment from the recipient, it sends the coordinate of the pole and polar angle to the recipient. With these positioning parameters the recipient can cover the reader onto the corresponding enciphered document sheet with proper coordinate and right orientation, so that the original document is revealed as four dimensional images and is ready to be read. With the changing of the visual angle, the images are alternating from invisible to visible and the contrast of the images is also changing alternatively.

With different reader covers on the same enciphered document sheet, different four dimensional images can be revealed.

According to the present invention, the steps of another method for enciphering the graph-text document and transferring on the network is as follows:

a. Sender uses a digital code rule provided by the control center to encipher and compress at least one graph-text document to make a cryptic digital graph-text document to send the recipient.

b. Recipient prints out the enciphered cryptic digital graph-text document on the document sheet by the use of the output facilities. Control center sends the positioning parameters, coordinate of the pole and polar angle, to the recipient. Recipient covers the reader sheet onto the document sheet at the right position and right orientation as indicated by the positioning parameters received. Thus the original document is revealed as 4 dimensional images and is ready to be read. With the changing of visual angle, the images are alternating from invisible to visible and the contrast of the images are also changing alternatively.

With different reader covers on the same enciphered document sheet, different four dimensional images can be revealed.

The advantages of the present invention are as follows:

It is possible to make full use of existing facilities, such as wired or wireless public communication networks, optical fiber communication networks, the Internet, communication satellites, and mobile or microwave communication networks, to facilitate the security transfer of the enciphered graph-text information.

Graph-text information is kept secret until it arrives at the final recipient. Documents are easy to deliver, to preserve, and to read.

Due to the use of four dimensional (4 parametric) digital enciphering, the technique is provided with the feature of multi-combination, uniqueness, arbitrariness and it seems that the retrograde action is impossible.

The technique can be used in many different fields such as trading, customs, taxation, credit cards, etc.

BRIEF DESCRIPTION OF THE DRAWINGS

The following explains the invention with reference to the drawings.

FIG. 1 is a block diagram of procedure for graph-text enciphering according to an embodiment of the present invention.

FIG. 2 is a schematic diagram of the sending, transferring and receiving of the document according to the procedure.

DESCRIPTION OF THE PREFERRED EMBODIMENT

Figure 3:
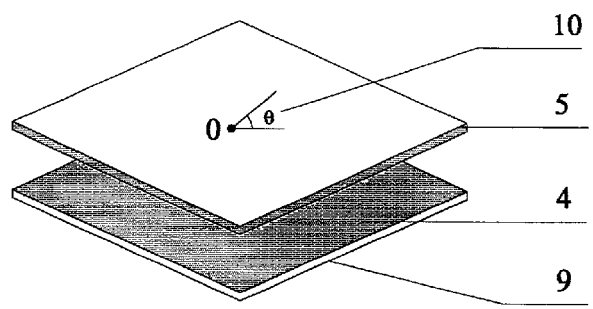
FIG. 3 is a schematic diagram for showing relative positioning of the reader sheet with respect to the document sheet.
Figures 4, 5:
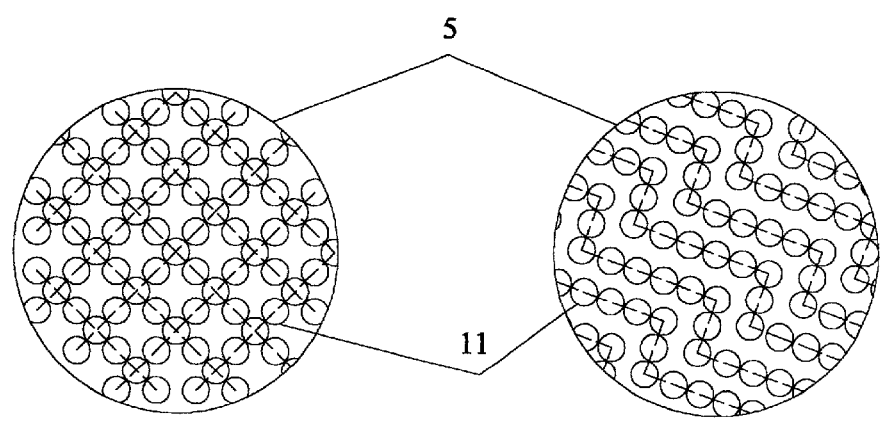
FIG. 4 is a schematic diagram of an array of the miniaturized lenses in a gridding arrangement on a reader.
FIG. 5 is a schematic diagram of an array of the miniaturized lenses in step-shaped arrangement on the reader.

As shown in FIGS. 1, 2, and 3, one of the techniques for graph-text enciphering and transfer on network is:

When there is some random communication between sender 7 and recipient 8 and the graph-text document 2 needs to be enciphered for transfer, the sender first has to apply for certain special digital code rule 3 from control center 1. Control center 1 sends the digital code rule 3 to the sender 7. Using the special digital code rule 3, sender 7 enciphers and compresses at least one graph-text document 2 to produce a cryptic digital graph-text document 4 and transfer it to recipient 8 or to a designated network address via the network 6, and sends an acknowledgment to control center 1 at the same time. After receiving the acknowledgment from the sender 7, the control center sends a corresponding number of the digital graph-text document for readers 5 to the recipient 8 or to the designated network address via the network 6. The cryptic graph-text document 4 will be printed out on the cryptic document sheet 9 using a printer or digital facsimile machine by recipient 8, and digital graph-text documents for readers 5 would also be printed out on transparent or translucent sheets to form the same number of readers 10. There are only dot groups on the document sheet 9 and the readers 10, and the graph-text documents are illegible. In order to view the images, recipient 8 has to request positioning parameters, the coordinate of the pole O and the polar angle θ, from the control center.

As shown in FIG. 3, the control center 1 sends the coordinate of the pole O and the polar angle θ to the recipient 8. The recipient 8 then covers the reader sheet 10 onto the document sheet 9 according to the parameters receiving from the control center 1, and the original document 2 is revealed from the cryptic graph-text documents sent by sender 7. With other readers 10 covering onto the same enciphered document sheet 9, other original document 2 within cryptic digital graph-text documents for reader 4 can also be read.

Another technique of graph-text enciphering and its security transfer on network can also be seen in the FIGS. 1, 2 and 3. That is: When there are frequent communications between sender 7 and recipient 8 and the graph-text document 2 needs to be enciphered for transfer, sender 7 first has to apply for a certain special digital code rule 3 from control center 1. Control center 1 sends the special digital code rule 3 to sender 7. With the special digital code rule, sender 7 enciphers and compresses at least one graph-text document 2 producing cryptic graph-text document 4 and transfers it to recipient 8 via the network 6. The recipient 8 then prints the cryptic graph-text document on the document sheet 9 by the use of a printer or digital facsimile machine. There are only dot groups on the document sheet 9 and the readers 10 which are prepared beforehand, and the graph-text documents are all illegible. Recipient 8 has to request the positioning parameters, the coordinates of the pole O and the polar angle θ, from the control center 1.

As shown in FIG. 3, the control center 1 sends the positioning parameters, the coordinates of the pole O and the polar angle θ, to the recipient 8 and the recipient 8 covers the reader 10 onto the cryptic document sheet 9 according to the parameters received, so that the cryptic graph-text document 4 which was transferred by the sender 7 is then revealed as the original document 2 and is ready to be read. With other readers 10 covering onto the same document sheet 9, successively different original documents 2 within cryptic graph-text document 4 can also be read respectively.

If transfer is done through a public network, the cryptic graph-text document can be transferred alone, or together with a digital graph-text document for the reader. Both of them can be sent to the same network address or to different ones. If transfer is through the Internet they can be sent to a designated network address or virtual network address. Each address can be locked out with several locks, and any related recipient who has joined "unlocking key assembly" through the network and has been authorized to have an unlocking key for getting a reader of certain class will be able to read the cryptic document of corresponding class on the network, thus realizing the point-to-point security transfer. This technique can be applied to the security transfer of graph-text document on wired or wireless communication network.

Figures 6, 7:
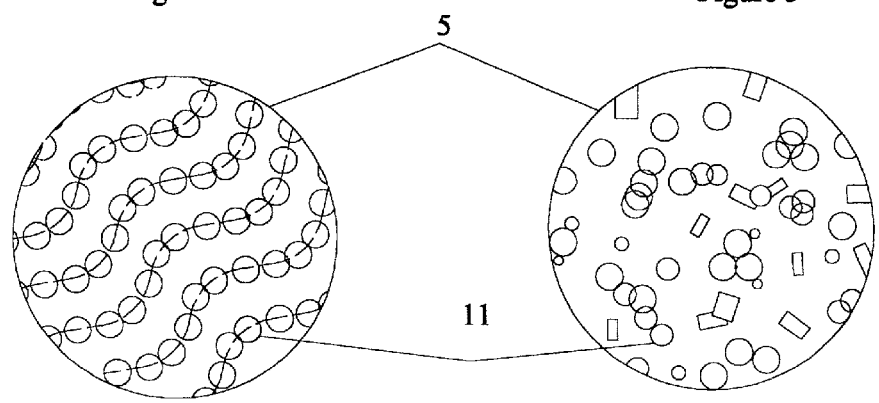
FIG. 6 is a schematic diagram of an array of the miniaturized lenses in a wavelike pattern arrangement on the reader.
FIG. 7 is a schematic diagram of an array of the miniaturized lenses in special shaped arrangement on the reader.

As shown in FIGS. 4, 5, 6, and 7, the reader 10 is composed of many miniaturized lenses 11 with special focal lengths. These lenses 11 are made of convexes or holes or the combination of convexes and holes. The arrangement of lenses 11 can be in gridded or in step-shaped or in wavelike patterns or with special combination. As shown in FIG. 7, the special combination arrangement of lenses is arranged with lenses of different sizes, shapes, directions and spacings and with the miniaturized change of these parameters, the different combinations of lenses can form different readers. For convenience of use, several different readers can be combined into one reader.

If the sender 7 communicates with the recipient 8 frequently, the recipient 8 can have several readers 10 with the serial number beforehand and keep them for long-time use. The reader 10 can be a rigid card or a flexible one and is made by typed or printed transparencies, or made by printing, photo etching, biting in, or heat pressing of transparent plastic sheets. Thus, the sender can only send the enciphered digital graph-text document to the recipient 8 and the recipient prints it out and reads it out by covering the specific reader 10 with the serial number which is designated by control center 1, which is kept in the recipient place beforehand, onto the document sheet in the right position and polar angle. While the reader is away from or out of the right position of the document sheet, the document is cryptic again. Worked in this way, the sender needs no longer transfer the information of readers with the document through the network and the recipient can keep the readers at all time for regular use.

Figure 8:
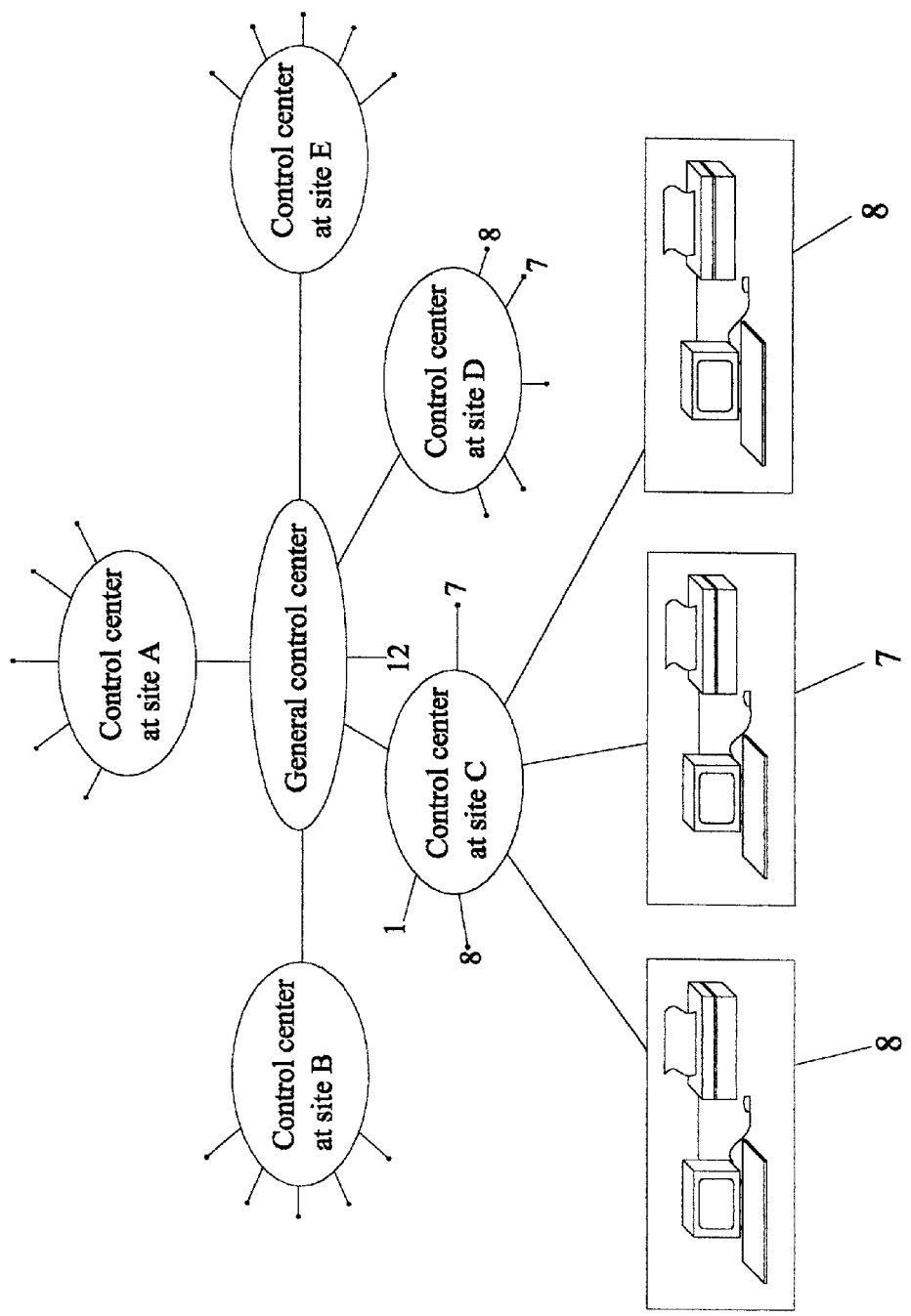
FIG. 8 is a schematic diagram of the network between the general control center and other control centers.

As shown in FIG. 8, many sub-control centers 1 are set at address A, B, C, D, E . . . under the general control center 12. Each sub-control center 1 has its own terminal user, the senders 7 and the recipients 8, working the way described in the present invention. The general control center 12 and the sub-control centers 1 in different addresses, together with all terminal user of the senders 7 and recipients 8, form a network of security graph-text transfer.

What is claimed is:

1. A technique of enciphering a graph-text document and its security transfer on network, wherein said technique comprises the following steps:

a. enciphering and compressing at least one graph-text document from a sender with a special digital code rule provided by a control center and producing a cryptic graph-text document, and then sending this cryptic graph-text document to a recipient and sending an acknowledgement to the control center respectively;

b. in response to the control center receiving the acknowledgement from the sender, sending to the recipient or to a designated network address at least one corresponding digital graph-text document for producing a reader;

c. and printing out the cryptic digital graph-text document as well as at least one digital graph-text document for reader on the document sheets respectively with appropriate output a reader; in which said reader is formed by the transparent or translucent sheets having digital graph-text documents for readers, and d. in response to receipt by the control center of the acknowledgement from the recipient, sending from the control center a coordinate of pole and polar angel to the recipient as positioning parameters, so that the recipient can use those positioning parameters to cover the reader onto the corresponding enciphered document sheet with proper coordinate and right orientation, whereby the original document is revealed as four dimensional images and is ready to be read, and whereby with the changing of the visual angle, the images are alternating from invisible to visible and the contrast of the images is also changing alternatively.

2. A process for enciphering a graph-text document and its security transfer on network, comprising:

a. using digital code rule provided by a control center for a sender to encipher and compress at least one graph-text document to make a cryptic digital graph-text document to send a recipient or a network;

b. printing the enciphered cryptic digital graph-text document on a document sheet by the recipient by use of output facilities; and sending from the control center positioning parameters including a coordinate of pole and a polar angle to the recipient, so that the recipient can cover the reader sheet onto the document sheet at the right position and right orientation as indicated by the positioning parameters received, so that original document is revealed as four dimensional images and is ready to be read, and so that with changing of visual angle, the images alternate from invisible to visible and the contrast of the images also changes alternatively, in which said reader is formed by the transparent or translucent sheets having digital graph-text documents for readers and is made according to the predetermined manners by the recipient or the sender.

* * * * *